J. NIEWOHNER.
NUT LOCK.
APPLICATION FILED SEPT. 18, 1911.

1,021,110.

Patented Mar. 26, 1912.

ATTEST
E. M. Fisher
J. C. Musson.

INVENTOR
JOHN NIEWOHNER
BY Fisher & Moser ATTYS.

COLUMBIA PLANOGRAPH CO., WASHINGTON, D. C.

UNITED STATES PATENT OFFICE.

JOHN NIEWOHNER, OF CLEVELAND, OHIO.

NUT-LOCK.

1,021,110.  Specification of Letters Patent.  Patented Mar. 26, 1912.

Application filed September 18, 1911. Serial No. 649,997.

*To all whom it may concern:*

Be it known that I, JOHN NIEWOHNER, citizen of the United States, residing at Cleveland, in the county of Cuyahoga and State of Ohio, have invented certain new and useful Improvements in Nut-Locks, of which the following is a specification.

This invention relates to nut locks, and consists in the novel and original construction of lock substantially as shown and described and particularly pointed out in the claim.

Figure 1:
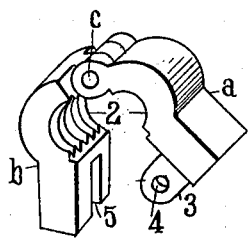
Figure 2:
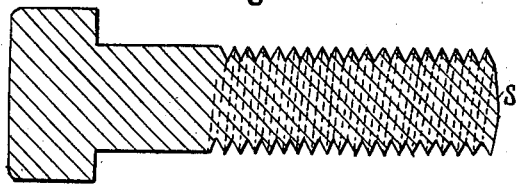
Figure 3:
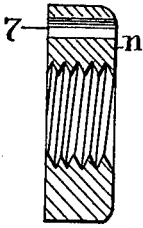
Figure 4:
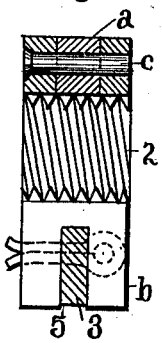
Figure 5:
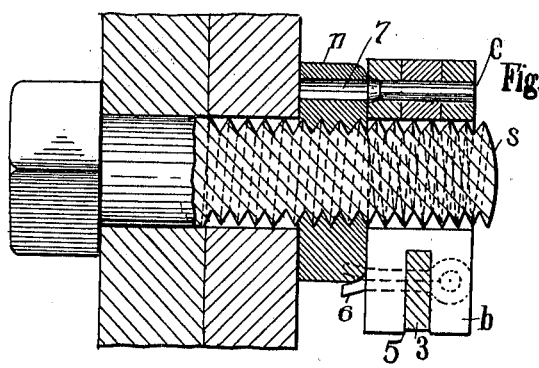
Figure 6:
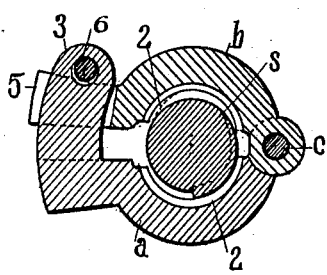
Figure 7:
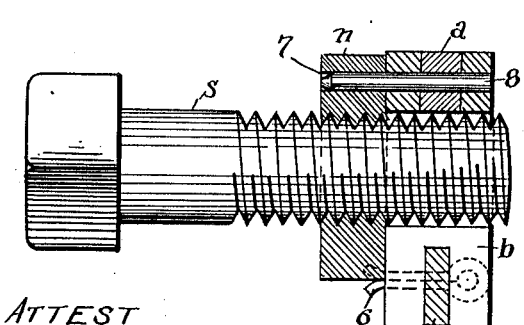

In the accompanying drawings, Figure 1 is a perspective view of the lock open. Fig. 2 is a longitudinal sectional view of a screw, and Figs. 3 and 4 are cross sections of the nut and lock respectively. Fig. 5 shows the parts assembled and in sections, and Fig. 6 is a cross section of the screw and the lock engaged thereon. Fig. 7 shows a modification of nut and lock mechanically engaged as hereinafter described.

The lock as thus shown is a unit consisting of equal portions or sections $a$ and $b$ provided with hinge ears engaged in working relation by a pintle $c$, which has a head countersunk in the corresponding ear of said hinge so as to be flush with the surface or edge of the said parts, and which edge comes next to the nut $n$. By placing the lock against the nut in this way it is impossible for the pintle to work out and it does not need to be upset or clenched at the other end and can be removed and inserted reversely when necessary.

Each section or part of the lock has a substantially semi-circular threaded cavity 2 cut with a left hand thread while the nut and bolt have right hand threads, and these cavities are adapted to be brought together and engage upon the screw threads of bolt $s$ next to nut $n$ in locking relations therewith as seen in Figs. 5 and 6. The reverse order of threads in the lock and bolt, respectively, bring the sharp edges thereof in engagement on bisecting lines and very little clamping pressure on the two sections is required to effectively embed the threads one within the other to fix the lock against the nut. Now, in order to lock the parts or sections together I provide the section $a$ with a flat sided projection or tongue 3 centrally on its inside which has a hole 4 and is adapted to enter an open slot 5 in the part or section $b$. The said hole 4 comes just on the outside of section $b$ when the lock is closed on the screw against the nut $n$ and a cotter pin 6 or other device which will hold its position and not shake or lose out is engaged through said hole and confines the lock in place.

In Fig. 7 I show the nut and the lock mechanically connected and whereby the nut can be locked on the screw regardless of any backing on the other side. This often is desirable in machinery for different purposes, and hence I have provided the nut $n$ with a hole 7 transversely through the same and made the pintle 8 long enough to enter into said hole more or less after passing through the lock and thus lock the said parts together. The nut is thus prevented from turning or being turned in either direction regardless of any bearing behind the same, and as it cannot turn with the reversely threaded lock, it cannot turn at all. In fact both nut and lock are locked against turning and one locks the other.

It will be observed that this lock is a cheap article of manufacture as it consists of only two parts which can each be cast complete and ready for use and that there is no hand labor in its manufacture except to drill the holes for the pintle and the locking pin. Furthermore the said parts or sections $a$ and $b$ can be of common cast iron, so that the original cost of stock is very small.

What I claim is:

In nut-locks, a nut having a hole transversely through the same, a two-section hinged lock for said nut having a thread reverse to the thread of the nut and means to interlock said lock and nut, in combination with a bolt having a threaded portion of the same cross section, whereby the nut can be locked in any position on the screw, whether tight or loose.

In testimony whereof I affix my signature in presence of two witnesses.

JOHN NIEWOHNER.

Witnesses:
 E. M. FISHER,
 F. C. MUSSUN.